United States Patent
Ren et al.

(10) Patent No.: US 11,782,268 B2
(45) Date of Patent: Oct. 10, 2023

(54) EYEBALL TRACKING SYSTEM FOR NEAR EYE DISPLAY APPARATUS, AND NEAR EYE DISPLAY APPARATUS

(71) Applicant: GOERTEK INC., Shandong (CN)

(72) Inventors: Hongen Ren, Shandong (CN); Bin Jiang, Shandong (CN); Xiaoyu Chi, Shandong (CN)

(73) Assignee: GOERTEK INC., Shandong (CN)

( * ) Notice: Subject to any disclaimer, the term of this patent is extended or adjusted under 35 U.S.C. 154(b) by 135 days.

(21) Appl. No.: 17/602,839

(22) PCT Filed: Dec. 31, 2019

(86) PCT No.: PCT/CN2019/130252
§ 371 (c)(1),
(2) Date: Oct. 11, 2021

(87) PCT Pub. No.: WO2021/128406
PCT Pub. Date: Jul. 1, 2021

(65) Prior Publication Data
US 2022/0146824 A1    May 12, 2022

(30) Foreign Application Priority Data
Dec. 25, 2019    (CN) .......................... 201911358389.6

(51) Int. Cl.
*G02B 27/00*    (2006.01)
*G02B 27/01*    (2006.01)

(52) U.S. Cl.
CPC ..... *G02B 27/0093* (2013.01); *G02B 27/0172* (2013.01); *G02B 2027/0138* (2013.01)

(58) Field of Classification Search
CPC .............. G02B 26/008; G02B 26/0833; G02B 27/0093; G02B 27/0172;
(Continued)

(56) References Cited

U.S. PATENT DOCUMENTS 9,529,191 B2    12/2016    Sverdrup et al.
10,394,034 B2    8/2019    Reshidko et al.
(Continued)

FOREIGN PATENT DOCUMENTS

CN    101329498    12/2008
CN    202093307    12/2011
(Continued)

OTHER PUBLICATIONS

International Search Report cited in PCT/CN2019/130252 dated Sep. 27, 2020.

*Primary Examiner* — Nelson M Rosario
(74) *Attorney, Agent, or Firm* — HAUPTMAN HAM, LLP (57) ABSTRACT

A near-eye display device and an eye tracking system for the near-eye display device are provided. The eye tracking system includes a processor, a control analysis device, an LED illuminating device, a DMD display device and an IR camera. The processor outputs a video signal corresponding to a video displayed on the near-eye display device to the control analysis device. The control analysis device generates an LED synchronization signal and a corresponding subfield display signal. The LED illuminating device drives an LED to emit light, and transmits the light emitted from the LED into the DMD display device. The DMD display device reflects the light into a lens to form an image, and projects the image onto an eye. The IR camera captures an eye image. The control analysis device acquires the eye image and analyzes the eye image to obtain gaze point information.

11 Claims, 3 Drawing Sheets

(58) Field of Classification Search
CPC ...... G02B 2027/0138; G02B 2027/014; G03B 21/008; G03B 21/204; G03B 17/54; H04N 23/20

See application file for complete search history.

(56) References Cited

U.S. PATENT DOCUMENTS

| | | |
|---|---|---|
| 2010/0110368 A1 | 5/2010 | Chaum |
| 2013/0077049 A1 | 3/2013 | Bohn |
| 2014/0146394 A1 | 5/2014 | Tout et al. |
| 2014/0293226 A1 | 10/2014 | Hainzl et al. |
| 2014/0354514 A1 | 12/2014 | Aronsson |
| 2015/0288944 A1 | 10/2015 | Nistico et al. |
| 2017/0171533 A1 | 6/2017 | Benitez et al. |
| 2017/0293799 A1 | 10/2017 | Skogo et al. |
| 2018/0157035 A1 | 6/2018 | Fujita |
| 2018/0246336 A1 | 8/2018 | Greenberg |
| 2018/0249150 A1 | 8/2018 | Takeda et al. |
| 2018/0278924 A1 | 9/2018 | Schowengerdt et al. |
| 2019/0018482 A1 | 1/2019 | Aleem et al. |
| 2019/0258062 A1 | 8/2019 | Aleem et al. |
| 2019/0282088 A1 | 9/2019 | Mohanty et al. |
| 2020/0012105 A1 | 1/2020 | Liu et al. |
| 2020/0033598 A1* | 1/2020 | Ma ................... H04N 9/3188 |
| 2020/0090375 A1 | 3/2020 | Mori et al. |
| 2020/0183155 A1 | 6/2020 | Xie et al. |
| 2020/0341269 A1* | 10/2020 | Mills ................... G02B 27/144 |

FOREIGN PATENT DOCUMENTS

| | | |
|---|---|---|
| CN | 102955255 | 3/2013 |
| CN | 103119512 | 5/2013 |
| CN | 104094197 | 10/2014 |
| CN | 104113680 | 10/2014 |
| CN | 104321685 | 1/2015 |
| CN | 104603673 | 5/2015 |
| CN | 104956252 | 9/2015 |
| CN | 106464861 | 2/2017 |
| CN | 106527662 | 3/2017 |
| CN | 106874895 | 6/2017 |
| CN | 107045256 | 8/2017 |
| CN | 107515466 | 12/2017 |
| CN | 107783297 | 3/2018 |
| CN | 107921871 | 4/2018 |
| CN | 108351515 | 7/2018 |
| CN | 108353137 | 7/2018 |
| CN | 108508600 | 9/2018 |
| CN | 110208947 | 9/2019 |
| CN | 110419063 | 11/2019 |
| CN | 110446965 | 11/2019 |
| CN | 110824699 | 2/2020 |
| EP | 3514606 | 1/2018 |
| WO | WO2019122808 | 6/2019 |

* cited by examiner

EYEBALL TRACKING SYSTEM FOR NEAR EYE DISPLAY APPARATUS, AND NEAR EYE DISPLAY APPARATUS

The present application is a 371 application of International Patent Application No. PCT/CN2019/130252, filed on Dec. 31, 2019 which claims the benefit of and priority to Chinese Patent Application No. 201911358389.6, titled "EYEBALL TRACKING SYSTEM FOR NEAR-EYE DISPLAY APPARATUS, AND NEAR-EYE DISPLAY APPARATUS", filed on Dec. 25, 2019 with the China National Intellectual Property Administration, which are is incorporated herein by reference in their entireties.

FIELD

Embodiments of the present disclosure relate to the technical field of near-eye display, and in particular to an eye tracking system for a near-eye display device, and a near-eye display device.

BACKGROUND

DLP, that is, digital light processing, is a technology that uses a micro-mirror array integrated on a semiconductor chip and controls rotation of each of micro-mirrors with the MEMS technology. These micro-mirrors quickly change their respective angles in response to a digital drive signal. A micro-mirror is tilted by 10° when a corresponding signal is received, thereby changing a reflection direction of an incident light. A micro-mirror, when being in a projection state, is indicated as "on" and tilted by an angle of +10° in response to the digital signal. A micro lens, when being in a non-projection state, is indicated as "off" and tilted by an angle of −10°. Further, the incident light reflected by the micro-mirror that is "on" passes through a transmission lens to form an image on a screen. The incident light reflected by the micro-mirror that is "off" is absorbed by a light absorber.

When a person looks in different directions, there are slight changes in their eyes, which produce extractable features. These features are extracted by a computer through image capturing or scanning, so as to track the changes in the eyes in real time, and predict user status and demand as well as respond to the user status and demand, thereby controlling a device with eyes. Described above is a basic principle of eye tracking technology.

In recent years, with development of VR/AR and other head-mounted products, an efficient user interaction technology is urgently required. As an interactive method, the eye tracking technology can complete human-computer interaction by only eyes without user hands or a language. Eye tracking is widely used.

At present, most eye tracking systems in the art generally use IR infrared radiation and infrared cameras, and operate in a dark pupil manner or a bright pupil manner depending on placement positions of an IR LED. In the dark pupil manner, IR LEDs are arranged around an eye and each emit infrared light to illuminate the eye. A part of the infrared light enters the eye through a pupil, and other part of the infrared light is reflected back. Therefore, a dark area captured by the camera is regarded as the pupil. In the bright pupil manner, an IR light source is arranged around the proximity to an optical axis, so that IR light is reflected from the back of the eye after entering the eye. In this case, the pupil is bright and therefore a bright area captured by the camera is regarded as the pupil. In both of the dark pupil manner and the bright pupil manner, the IR LEDs are arranged around the eye, and the IR camera for capturing the pupil is arranged under the eye. Since head-mounted devices such as VR or AR devices each provided with a small space near the eye, arrangement of the IR camera brings a significant difficulty to project implementation, and may result in increased overall volume and high cost of the device.

In view of this, how to provide an eye tracking system for a near-eye display device and a near-eye display device which solve the above technical problems has become a problem to be solved by those skilled in the art.

SUMMARY

An objective of embodiments of the present disclosure is to provide an eye tracking system for a near-eye display device and a near-eye display device, which are based on a light and thin lens, thereby reducing overall volume of the device and cost of the device.

To solve the above technical problems, an eye tracking system for a near-eye display device is provided according to an embodiment of the present disclosure. The eye tracking system includes a processor, a control analysis device, an LED illuminating device, a DMD display device, and an IR camera. The processor is configured to output a video signal corresponding to a video currently displayed on the near-eye display device. The control analysis device is configured to: acquire, based on the video signal and a preset IR image signal, a multicolor image signal comprising the IR image signal; generate an LED synchronization signal and a subfield display signal corresponding to the LED synchronization signal; generate an acquisition signal when the LED synchronization signal and the subfield display signal both correspond to the IR image signal; acquire gaze point information based on an eye image captured by the IR camera. The LED illuminating device is configured to drive an LED to emit light in response to the LED synchronization signal, and transmit the light emitted from the LED into the DMD display device. The LED illuminating device includes an LED module arranged in an optical machine, and the LED module includes an IR LED. The DMD display device is configured to reflect the light into a lens in response to the subfield display signal to form an image of a color, and project the image onto an eye through an optical waveguide mirror. The IR camera is configured to capture the eye image in response to the acquisition signal.

In an embodiment, the LED illuminating device further includes an LED driver, a dichroic mirror group and a homogenization system. The dichroic mirror group and the homogenizing system are arranged inside the optical machine. The LED module further includes an R LED, a G LED and a B LED. The LED driver is configured to generate an LED drive signal in response to the LED synchronization signal, to drive the LED in the LED module to emit the light, and transmit the light into the homogenization system through the dichroic mirror group. The homogenization system is configured to convert the light into light with uniform brightness and transmit the converted light into the DMD display device.

In an embodiment, all image signals in the multicolor image signal have an equal duty cycle.

In an embodiment, image signals other than the IR image signal in the multicolor image signal have an equal duty cycle, and a duty cycle of the IR image signal is greater than the duty cycle of other image signals.

In an embodiment, the preset IR image signal is determined based on a preset to-be-illuminated position on the eye and a preset pattern.

In an embodiment, the multicolor image signal including the IR image signal is acquired based on the video signal and the preset IR image signal by: performing image segmentation on the video signal according to a color sequential display rule to obtain image signals comprising an R image signal, a G image signal and a B image signal; and inserting the preset IR image signal among the R, G, B image signals to obtain the multicolor image signal comprising the R image signal, the G image signal, the B image signal and the IR image signal.

In an embodiment, the homogenization system includes a condenser lens, an optical rod, and a homogenization lens.

In an embodiment, the dichroic mirror group includes a first dichroic mirror, a second dichroic mirror and a third dichroic mirror arranged in parallel. One of the B LED, the R LED, and the G LED shares an optical axis with the dichroic mirror group and the homogenization system.

In a case where the B LED shares an optical axis with the dichroic mirror group and the homogenization system, blue light emitted from the B LED is transmitted into the homogenization system through the first dichroic mirror, the second dichroic mirror and the third dichroic mirror. Green light emitted from the G LED is reflected by the first dichroic mirror and then transmitted into the homogenization system through the second dichroic mirror and the third dichroic mirror. Red light emitted from the R LED is reflected by the second dichroic mirror and then transmitted into the homogenization system through the third dichroic mirror. IR light emitted from the IR LED is reflected by the third dichroic mirror and then transmitted into the homogenization system.

In a case where the R LED shares an optical axis with the dichroic mirror group and the homogenization system, red light emitted from the R LED is transmitted into the homogenization system through the first dichroic mirror, the second dichroic mirror and the third dichroic mirror. Green light emitted from the G LED is reflected by the first dichroic mirror and then transmitted into the homogenization system through the second dichroic mirror and the third dichroic mirror. Blue light emitted from the B LED is reflected by the second dichroic mirror and then transmitted into the homogenization system through the third dichroic mirror. IR light emitted from the IR LED is reflected by the third dichroic mirror and then transmitted into the homogenization system.

In a case where the G LED shares an optical axis with the dichroic mirror group and the homogenization system, green light emitted from the G LED is transmitted into the homogenization system through the first dichroic mirror, the second dichroic mirror and the third dichroic mirror. Green light emitted from the B LED is reflected by the first dichroic mirror and then transmitted into the homogenization system through the second dichroic mirror and the third dichroic mirror. Red light emitted from the R LED is reflected by the second dichroic mirror and then transmitted into the homogenization system through the third dichroic mirror. IR light emitted from the IR LED is reflected by the third dichroic mirror and then transmitted into the homogenization system.

A near-eye display device is provided according an embodiment of the present disclosure. The near-eye display device includes the eye tracking system as described above.

In an embodiment, the near-eye display device is an AR head-mounted device.

An eye tracking system for a near-eye display device is provided according to an embodiment of the present disclosure. The eye tracking system includes a processor, a control analysis device, an LED illuminating device, a DMD display device and an IR camera. The processor is configured to output a video signal corresponding to a video currently displayed on the near-eye display device to the control analysis device. The control analysis device is configured to: acquire a multicolor image signal including an IR image signal based on the video signal and a preset IR image signal; and generate, based on the multicolor image signal, an LED synchronization signal and a subfield display signal corresponding to the LED synchronization signal. The LED synchronization signal is transmitted to the LED illuminating device, and the subfield display signal is transmitted to the DMD display device, so that the LED illuminating device drives an LED to emit light in response to the LED synchronization signal. The light emitted from the LED is transmitted into the DMD display device. In response to the subfield display signal, the DMD display device reflects the light into a lens to form an image and projects the image onto an eye through an optical waveguide mirror. When the LED synchronization signal transmitted to the LED illuminating device and the subfield display signal transmitted to the DMD display device both correspond to the IR image signal, the image projected onto the eye correspond to the IR image signal, and the control analysis device generates an acquisition signal. The IR camera captures an eye image in response to the acquisition signal. The control analysis device acquires the eye image and analyze the eye image to obtain gaze point information. In this way, eye tracking is implemented. According to the present disclosure, only one IR LED is required and is disposed inside the optical machine, rather than multiple IR LEDs around the lens. Therefore, the lens is light and thin, thereby reducing overall volume and cost of the device. A near-eye display device is further provided in the present disclosure, which has the same beneficial effects as described above.

BRIEF DESCRIPTION OF THE DRAWINGS

In order to more clearly illustrate technical solutions in embodiments of the present disclosure, the drawings to be used in the description of the embodiments or the conventional technology are briefly described hereinafter. Apparently, the drawings described below illustrate only some embodiments of the present disclosure. Other drawings may be obtained by those skilled in the art from the drawings without any creative effort.

DETAILED DESCRIPTION

An eye tracking system of a near-eye display device and a near-eye display device are provided according to embodiments of the present application provide. The eye tracking system includes a thin lens, so that an overall volume and cost of the device are reduced.

In order to make the objectives, technical schemes and advantages of the embodiments of the present disclosure clearer, technical solutions in embodiments of the present disclosure are described clearly and completely hereinafter in conjunction with the drawings in the embodiments. It is apparent that the described embodiments are only some rather than all of the embodiments of the present disclosure. All other embodiments acquired by those skilled in the art based on the embodiments of the present disclosure without any creative effort shall fall within the protection scope of the present disclosure.

Figure 1:
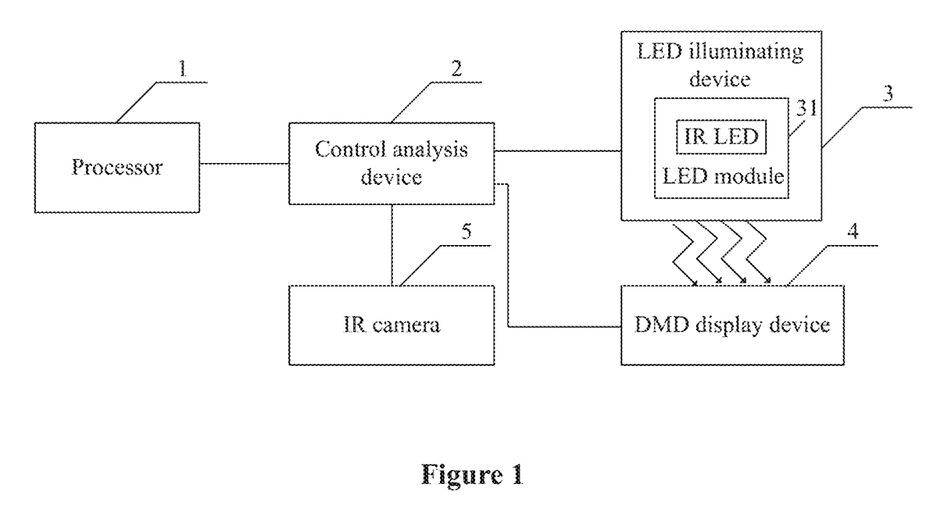
FIG. 1 is a schematic structural diagram of an eye tracking system for a near-eye display device according to an embodiment of the present disclosure.

Reference is made to FIG. 1, which is a schematic structural diagram of an eye tracking system for a near-eye display device according to an embodiment of the present disclosure. The eye tracking system for a near-eye display device includes a processor 1, a control analysis device 2, an LED illuminating device 3, a DMD display device 4, and an IR camera 5.

The processor 1 is configured to output a video signal corresponding to a video currently displayed on the near-eye display device.

The control analysis device 2 is configured to acquire a multicolor image signal including an IR image signal based on the video signal and a preset IR image signal; and generate an LED synchronization signal and a subfield display signal corresponding to the LED synchronization signal. The control analysis device 2 is further configured to generate an acquisition signal when the LED synchronization signal and the subfield display signal both correspond to the IR image signal; and acquire gaze point information based on an eye image acquired by the IR camera.

The LED illuminating device 3 is configured to drive an LED to emit light in response to the LED synchronization signal, and transmit the light emitted from the LED into the DMD display device. The LED illuminating device 3 includes an LED module 31 disposed in an optical machine. The LED module includes an IR LED.

The DMD display device 4 is configured to reflect the light into a lens in response to the subfield display signal to form an image corresponding to a color, and project the image onto an eye through an optical waveguide mirror.

The IR camera 5 is configured to acquire the eye image in response to the acquisition signal.

It should be noted that the processor 1 according to the present disclosure outputs a video signal corresponding to a video currently displayed on the near-eye display device to the control analysis device 2. The video currently displayed on the near-eye display device is generated by the near-eye display device by means of rendering, or is acquired from a network or acquired in other manners. When receiving the video signal, the control analysis device 2 performs image segmentation on the video signal according to a color sequential display rule to obtain multiple primary color image signals, and inserts the preset IR image signal among the primary color image signals to obtain a multicolor image signal including the IR image signal. The LED illuminating device 3 includes LEDs corresponding to colors indicated by the primary color image signals, respectively.

In some embodiments, after acquiring the multicolor image signal, the control analysis device 2 generates the LED synchronization signal and the subfield display signal corresponding to the LED synchronization signal based on the multicolor image signal. The LED synchronization signal is transmitted to the LED illuminating device 3, and the subfield display signal is transmitted to the DMD display device 4. The LED synchronization signal is an illumination timing signal for driving the LEDs in the LED illuminating device 3 to emit light. The subfield display signal is a DMD display timing signal for driving the DMD display device 4. The illumination timing signal corresponds to the DMD display timing signal. In other words, the LED illuminating device 3 is configured to drive an LED in the LED module 31 to emit light in response to the LED synchronization signal, and transmit the light emitted from the LED into the DMD display device 4, specifically to a DMD in the DMD display device 4. The DMD reflects the light into the lens in response to the received subfield display signal corresponding to the LED synchronization signal (for example, the subfield display signal corresponding to an R LED synchronization signal is an R image signal), to form an image corresponding to the LED synchronization signal and project the image through the optical waveguide mirror onto the eye. When images corresponding to primary colors are projected onto the eye, a colorful image is seen. For example, for the three primary colors including R color, G color, and B color, a colorful image is seen when images respectively corresponding to an R image signal, a G image signal, and a B image signal are projected onto the eye. An image corresponding to an IR image signal is not seen when being projected onto the eye since the IR light is invisible. Therefore, a visual effect is not affected, and an image corresponding to the IR image signal is captured by the IR camera. Based on this, when the LED synchronization signal and the subfield display signal both correspond to the IR image signal, that is, when the IR LED in the LED module 31 emits light and the DMD display device 4 receives the subfield display signal corresponding to an IR LED synchronization signal and projects an IR image corresponding to the IR LED synchronization signal onto the eye through the lens, the control analysis device 2 transmits the acquisition signal to the IR camera 5 so that the IR camera 5 acquires an eye image. The control analysis device 2 acquires the eye image captured by the IR camera 5 and calculates the gaze point information of the eye (which specifically is a gaze distance and position of the eye) by using an analysis algorithm. In this way, eye tracking is implemented.

Figure 2:
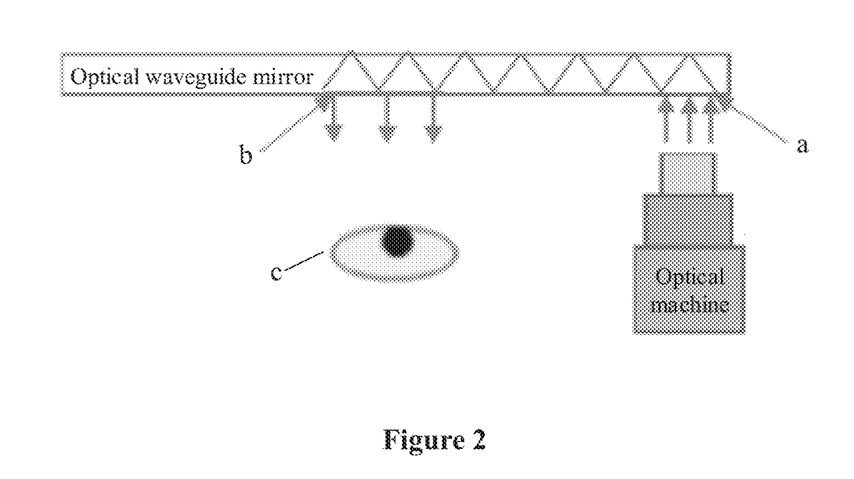
FIG. 2 is a schematic diagram of a principle of projecting an image onto an eye by an optical machine according to an embodiment of the present disclosure.

It should be noted that, reference is made to FIG. 2 for a principle that the DMD display device 4 reflects the light into the lens to form an image of a corresponding color and projects the image onto the eye when receiving the subfield display signal. Light from the lens in the optical machine are projected onto the eye through an optical waveguide mirror. An input region a is provided with a prism, a micro-mirror array, a diffraction grating, or the like. An output region b is provide with a prism, a micro-mirror array, a diffraction grating, or the like. When the IR light is emitted, the IR camera 5 is activated to capture the eye image (which specifically is an image of the pupil).

Figure 3:
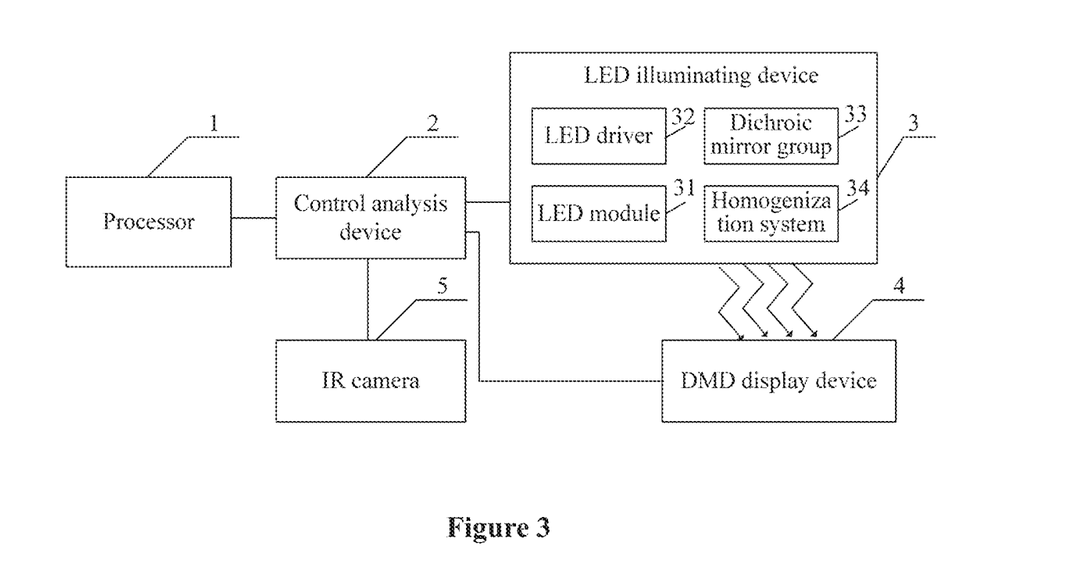
FIG. 3 is a schematic structural diagram of the eye tracking system for a near-eye display device according to another embodiment of the present disclosure.
Figure 4:
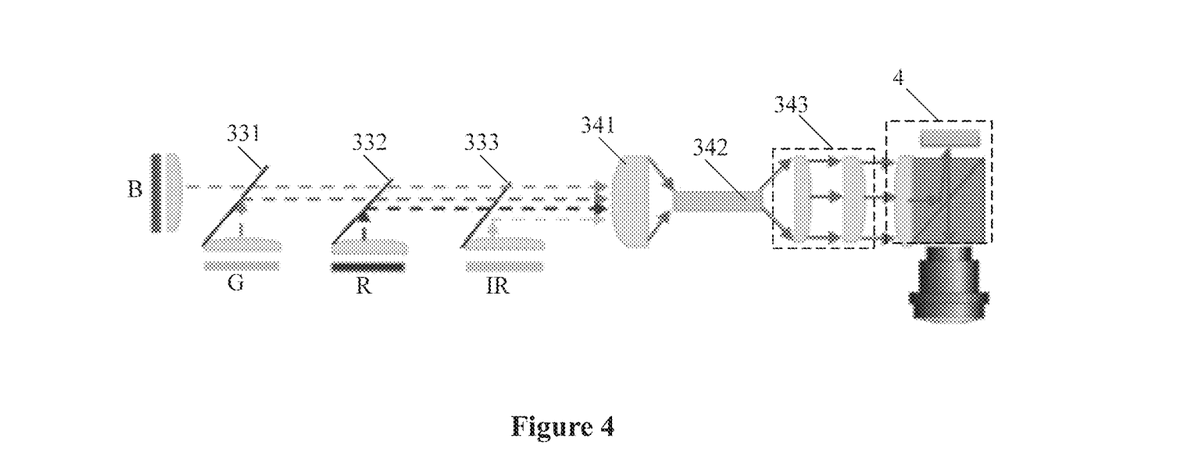
FIG. 4 is a schematic diagram of an internal structure of an optical machine according to an embodiment of the present disclosure.

Referring to FIG. 3 and FIG. 4, the LED illuminating device 3 in the present disclosure further includes an LED driver 32, a dichroic mirror group 33 and a homogenization system 34, where the dichroic mirror group 33 and the homogenizing system 34 are provided in the optical machine. The LED module 31 further includes an R LED, a G LED and a B LED.

The LED driver 32 is configured to generate an LED drive signal based on the LED synchronization signal, to drive an LED in the LED module to emit light in response to the LED drive signal. The light emitted from the LED is transmitted through the dichroic mirror group 33 into the homogenization system 34.

The homogenization system 34 is configured to convert the received light into light with uniform brightness and transmit the converted light into the DMD display device 4.

Specifically, the LED module 31 in the present disclosure includes 4 LEDs, namely, the R LED, the G LED, the B LED, and the IR LED. In this case, the multiple primary color image signals acquired by performing image segmentation on the video signal by the control analysis device 2 include an R image signal, a G image signal, and a B image signal. The IR image signal is inserted among the R image signal, the G image signal, and the B image signal. That is, a timing signal for controlling the IR LED is inserted among timing signals for controlling the R LED, the G LED, and the B LED, so that the R LED, the G LED, the B LED, and the IR LED emit light as indicated by the LED synchronization signal.

In the present disclosure, the control analysis device 2 transmits the generated LED synchronization signal to the LED driver 32 in the LED illuminating device 3, so that the LED driver 32 drives an LED corresponding a color to emit light in response to the LED synchronization signal. The Light emitted from the LED is transmitted through the dichroic mirror group 33 into the homogenization system 34. For example, if the current LED synchronization signal corresponds to an R image signal, the LED driver 32 drives the R LED to emit red light. In the present disclosure, the light emitted from the LED is transmitted through the homogenization system 34 and then is transmitted into the DMD display device 4, so as to homogenize brightness of the light, thereby improving quality of a final image.

Figure 5:
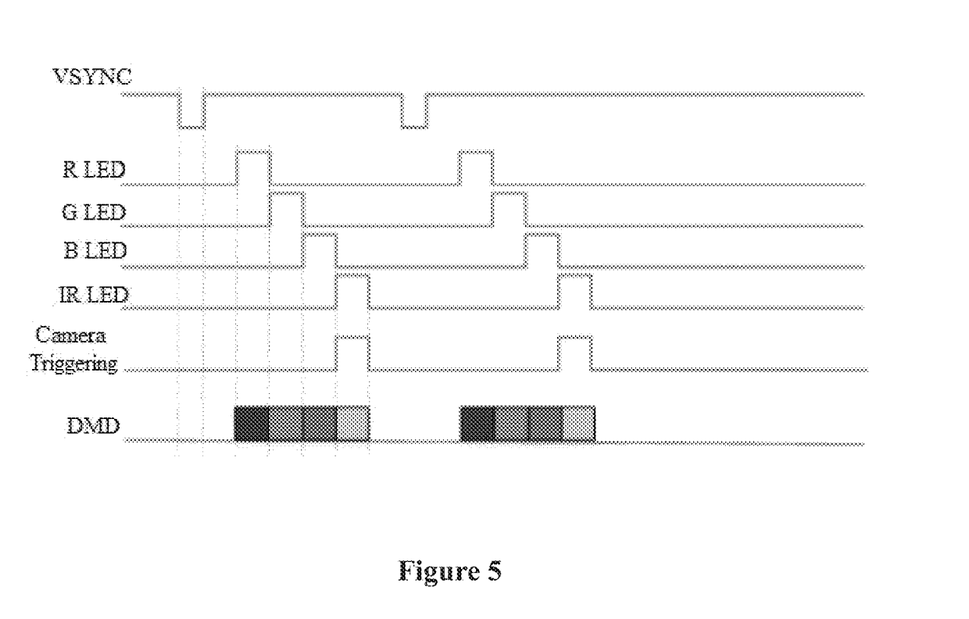
FIG. 5 is a schematic diagram of a timing signal according to an embodiment of the present disclosure.

It should further be noted that in the present disclosure, duty cycles of image signals in the multicolor image signal are equal. For example, the duty cycle of the R image signal, the duty cycle of the G image signal, the duty cycle of the B image signal, and the duty cycle of the IR image signal are equal. Specifically, reference is made to FIG. 5 for illumination timing signals for the LEDs in the LED illuminating device. In FIG. 5, VSYNC represents a frame signal. During a display cycle of a frame of image, the R LED, G LED, B LED, and IR LED are sequentially drive to emit light. The IR camera 5 is triggered when the IR LED emits light, to capture an eye image. Since the micro-mirror array in the DMD display device 4 flips rapidly, inserting an IR timing signal among RGB timing signals does not reduce the display refresh rate, that is, a frequency of the VSYNC signal.

Figure 6:
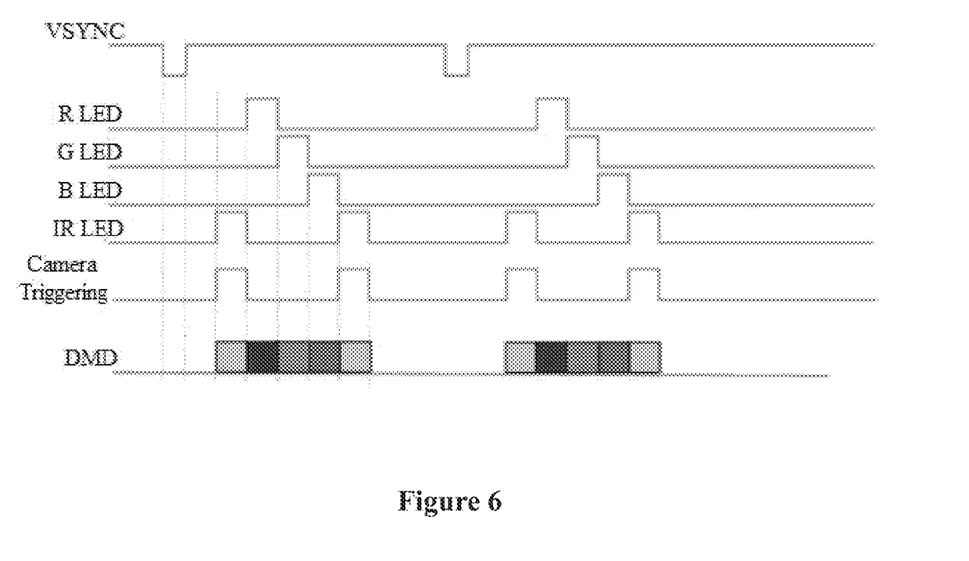
FIG. 6 is a schematic diagram of a timing signal according to another embodiment of the present disclosure.

In addition, in practical applications, the duty cycles of the image signals in the multicolor image signal other than the IR image signal are equal, and the duty cycle of the IR image signal may be greater than those of the other image signals. Specifically, the duty cycle of the IR image signal may be increased by inserting two periods during which the IR LED emits light in one cycle so as to increase a frame rate (and speed) of eye tracking. As shown in FIG. 6, inserting two periods during which the IR LED emits light in one cycle may double the rate of eye tracking.

It should be noted that the duty cycles of the image signals in the multicolor image signal may be different, where the duty cycle of each of the image signals may be determined based on actual needs, and is not restricted herein.

In FIG. 5 and FIG. 6, camera triggering represents the acquisition signal to trigger the IR camera to capture an image, and DMD represents the DMD display timing signal.

Furthermore, the preset IR image signal in the present disclosure is obtained based on a preset to-be-illuminated position on the eye and a preset pattern.

Specifically, the to-be-illuminated position on the eye and the preset pattern are set in advance. An IR pattern to be finally projected onto the eye by the DMD display device 4 when the IR LED emits light is determined based on the to-be-illuminated position on the eye and the preset pattern. In practical applications, a to-be-illuminated area on the eye is preset, for example, only a certain area on the eye is to-be-illuminated, so as to simplify calculation of the algorithm or take a person with a defective eye (such as strabismus) into consideration. Compared with the conventional technology in which the LEDs are arranged around the eye to illuminate the entire eye and thus a to-be-illuminated area cannot be flexibly preset, application of the present disclosure is wider and more flexible.

Furthermore, a process of the control analysis device 2 acquiring a multicolor image signal including an IR image signal based on the video signal and a preset IR image signal is described as follows. The control analysis device 2 performs image segmentation on the video signal according to a color sequential display rule to obtain image signals of three colors including an R image signal, a G image signal and a B image signal. Then, the control analysis device 2 inserts the preset IR image signal among the image signals of three colors to obtain a multicolor image signal including the R image signal, the G image signal, the B image signal and the IR image signal.

Specifically, when receiving the video signal, the control analysis device 2 performs image segmentation on the video signal according to the color sequential display rule to obtain primary color image signals which correspond to primary colors of the R LED, G LED, and B LED in the LED module 31, respectively; and inserts the preset IR image signal among the primary color image signals to obtain the multicolor image signal including the IR image signal.

In addition, the homogenization system 34 in the present disclosure includes a condenser lens 341, an optical rod 342, and a homogenization lens 343. The homogenization system 34 may be implemented by other optical devices in practical applications.

Furthermore, referring to FIG. 4, the dichroic mirror group 33 in the present disclosure includes a first dichroic mirror 331, a second dichroic mirror 332, and a third dichroic mirror 333 arranged in parallel. One of the B LED, the R LED, and the G LED is arranged having an optical axis with the dichroic mirror group 33 and the homogenization system 34.

For example, in a case where the B LED has an optical axis with the dichroic mirror group 33 and the homogenizing system 34, blue light emitted from the B LED is transmitted into the homogenization system 34 through the first dichroic mirror 331, the second dichroic mirror 332 and the third dichroic mirror 333. Green light emitted from the G LED is reflected by the first dichroic mirror 331 and then transmitted into the homogenization system 34 through the second dichroic mirror 332 and the third dichroic mirror 333. Red light emitted from the R LED is reflected by the second dichroic mirror 332 and then transmitted into the homogenization system 34 through the third dichroic mirror 333. IR light emitted from the IR LED is reflected by the third dichroic mirror 333 and then transmitted into the homogenization system 34.

Specifically, referring to FIG. 4, the first dichroic mirror 331 can reflect green light and transmit light of other colors, the second dichroic mirror 332 can reflect red light and transmit light of other colors, and the third dichroic mirror 333 can reflect IR light and transmit light of other colors. Functions of each dichroic mirror are realized by coating.

The light emitted from an LED is transmitted through a corresponding dichroic mirror into the homogenizing system 34.

In a case where the R LED has an optical axis with the dichroic mirror group 33 and the homogenizing system 34, red light emitted from the R LED is transmitted into the homogenization system 34 through the first dichroic mirror 331, the second dichroic mirror 332 and the third dichroic mirror 333. Green light emitted from the G LED is reflected by the first dichroic mirror 331 and then transmitted into the homogenization system 34 through the second dichroic mirror 332 and the third dichroic mirror 333. Blue light emitted from the B LED is reflected by the second dichroic mirror 332 and then transmitted into the homogenization system 34 through the third dichroic mirror 333. IR light emitted from the IR LED is reflected by the third dichroic mirror 333 and then transmitted into the homogenization system 34.

In a case where the G LED has an optical axis with the dichroic mirror group 33 and the homogenizing system 34, green light emitted from the G LED is transmitted into the homogenization system 34 through the first dichroic mirror 331, the second dichroic mirror 332 and the third dichroic mirror 333. Green light emitted from the B LED is reflected by the first dichroic mirror 331 and then transmitted into the homogenization system 34 through the second dichroic mirror 332 and the third dichroic mirror 333. Red light emitted from the R LED is reflected by the second dichroic mirror 332 and then transmitted into the homogenization system 34 through the third dichroic mirror 333. IR light emitted from the IR LED is reflected by the third dichroic mirror 333 and then transmitted into the homogenization system 34.

The light that can be transmitted and reflected by each of the first dichroic mirror 331, the second dichroic mirror 332, and the third dichroic mirror 333 varies with the LED that has an optical axis with the dichroic mirror group 33 and the homogenizing system 34, which is realized by coating each dichroic mirror based on actual needs, and is not specifically limited herein.

That is, in practical applications, the R LED, G LED, B LED, and IR LED are unnecessarily arranged in the order as shown in FIG. 5. Arrangement of the LEDs are variable, as long as the arrangement of the dichroic mirrors is adjusted accordingly, which are determined based on an actual situation.

Moreover, in the present disclosure, the dichroic mirror group 33, the homogenization system 34, and the LED module 31 in the LED illuminating device 3 are all disposed inside the optical machine. The DMD display device 4 and the lens may also be disposed inside the optical machine. In this way, there is no need to provide any LED on the lens, thereby lighting and thinning the lens.

The processor according to the present disclosure is configured to output a video signal corresponding to a video currently displayed on the near-eye display device to the control analysis device. The control analysis device is configured to: acquire a multicolor image signal including an IR image signal based on the video signal and a preset IR image signal; and generate, based on the multicolor image signal, an LED synchronization signal and a subfield display signal corresponding to the LED synchronization signal. The LED synchronization signal is transmitted to the LED illuminating device, and the subfield display signal is transmitted to the DMD display device. The LED illuminating device drives an LED to emit light in response to the LED synchronization signal, and the light emitted from the LED is transmitted into the DMD display device. Further, the DMD display device receives the subfield display signal, reflects the light into a lens to form an image and projects the image onto an eye. When the LED synchronization signal transmitted to the LED illuminating device and the subfield display signal transmitted to the DMD display device both correspond to the IR image signal, the image projected onto the eye corresponds to the IR image signal, and the control analysis device generates an acquisition signal. The IR camera captures an eye image in response to the acquisition signal. The control analysis device acquires the eye image and analyzes the eye image to obtain gaze point information. In this way, eye tracking is implemented. According to the present disclosure, only one IR LED is required and is disposed inside the optical machine, rather than multiple IR LEDs around the lens. Therefore, the lens is light and thin, thereby reducing overall volume and cost of the device. A near-eye display device is further provided in the present disclosure, which has the same beneficial effects as described above.

Based on the above embodiments, a near-eye display device is provided according to an embodiment of the present disclosure. The near-eye display device includes the eye tracking system as described above.

In an embodiment, the near-eye display device is an AR head-mounted device or a VR head-mounted device, which is not limited herein.

It should be noted that the near-eye display device provided in the present disclosure has the same beneficial effects as the eye tracking system for a near-eye display device provided in the above embodiments. Reference is made to the above embodiments for detailed description of the eye tracking system for a near-eye display device according to the present disclosure, which is not repeated herein.

Embodiments of the present disclosure are described in a progressive manner, each of the embodiments emphasizes differences from other embodiments, and the same or similar parts among the embodiments may be referred to each other. Description of the device disclosed in the embodiments is simplified, since the device corresponds to the system disclosed in the embodiments, reference may be made to the description of the system for related explanations.

It is further noted that the relational terms such as "first", "second" are merely used herein to distinguish one entity or operation from another, rather than to necessitate or imply an actual relationship or order of these entities or operations. Furthermore, terms "include", "comprise" or any other variants thereof are intended to be non-exclusive. Therefore, a process, method, article or device including a series of elements includes not only the elements but also other elements that are not enumerated or other elements inherent to such process, method, article or device. Unless expressively limited otherwise, the statement described as "comprising/including a(n) . . . " does not exclude existence of another identical element in such process, method, article or device.

Those skilled in the art can implement or use the present disclosure based on the above description of the disclosed embodiments. It is apparent for those skilled in the art to make various modifications to these embodiments. The general principle defined herein may be applied to other embodiments without departing from the spirit or scope of the present disclosure. Therefore, the present disclosure is not limited to the embodiments described herein but has the widest scope that complies with the principle and novelty disclosed in this specification.

The invention claimed is:

1. An eye tracking system for a near-eye display device, comprising:
a processor, a control analysis device, a light-emitting diode (LED) illuminating device, a digital micro-mirror display (DMD) display device and an infrared radiation (IR) camera, wherein
the processor is configured to output a video signal corresponding to a video currently displayed on the near-eye display device;
the control analysis device is configured to:
acquire, based on the video signal and a preset IR image signal, a multicolor image signal comprising the IR image signal;
generate an LED synchronization signal and a subfield display signal corresponding to the LED synchronization signal;
generate an acquisition signal when the LED synchronization signal and the subfield display signal both correspond to the IR image signal; and
acquire gaze point information based on an eye image captured by the IR camera;
the LED illuminating device is configured to drive an LED to emit light in response to the LED synchronization signal, and transmit the light emitted from the LED into the DMD display device, wherein the LED illuminating device comprises an LED module arranged in an optical machine, and the LED module comprises an IR LED;
the DMD display device is configured to reflect the light into a lens in response to the subfield display signal to form an image of a color, and project the image onto an eye through an optical waveguide mirror; and
the IR camera is configured to capture the eye image in response to the acquisition signal;
the LED illuminating device further comprises an LED driver, a dichroic mirror group and a homogenization system, wherein
the dichroic mirror group and the homogenization system are arranged in the optical machine, and the LED module further comprises an R LED, a G LED and a B LED;
the LED driver is configured to generate an LED drive signal in response to the LED synchronization signal, to drive the LED in the LED module to emit the light, and transmit the light into the homogenization system through the dichroic mirror group; and
the homogenization system is configured to convert the light into light with uniform brightness and transmit the converted light into the DMD display device;
the dichroic mirror group comprises a first dichroic mirror, a second dichroic mirror and a third dichroic mirror arranged in parallel, and
one of the B LED, the R LED, and the G LED shares an optical axis with the dichroic mirror group and the homogenization system, wherein
in a case where the B LED shares an optical axis with the dichroic mirror group and the homogenization system, blue light emitted from the B LED is transmitted into the homogenization system through the first dichroic mirror, the second dichroic mirror and the third dichroic mirror; green light emitted from the G LED is reflected by the first dichroic mirror and then transmitted into the homogenization system through the second dichroic mirror and the third dichroic mirror; red light emitted from the R LED is reflected by the second dichroic mirror and then transmitted into the homogenization system through the third dichroic mirror; and IR light emitted from the IR LED is reflected by the third dichroic mirror and then transmitted into the homogenization system;
in a case where the R LED shares an optical axis with the dichroic mirror group and the homogenization system, red light emitted from the R LED is transmitted into the homogenization system through the first dichroic mirror, the second dichroic mirror and the third dichroic mirror; green light emitted from the G LED is reflected by the first dichroic mirror and then transmitted into the homogenization system through the second dichroic mirror and the third dichroic mirror; blue light emitted from the B LED is reflected by the second dichroic mirror and then transmitted into the homogenization system through the third dichroic mirror; and IR light emitted from the IR LED is reflected by the third dichroic mirror and then transmitted into the homogenization system; and
in a case where the G LED shares an optical axis with the dichroic mirror group and the homogenization system, green light emitted from the G LED is transmitted into the homogenization system through the first dichroic mirror, the second dichroic mirror and the third dichroic mirror; blue light emitted from the B LED is reflected by the first dichroic mirror and then transmitted into the homogenization system through the second dichroic mirror and the third dichroic mirror; red light emitted from the R LED is reflected by the second dichroic mirror and then transmitted into the homogenization system through the third dichroic mirror; and IR light emitted from the IR LED is reflected by the third dichroic mirror and then transmitted into the homogenization system.

2. The eye tracking system for a near-eye display device according to claim 1, wherein all image signals in the multicolor image signal have an equal duty cycle.

3. The eye tracking system for a near-eye display device according to claim 2, wherein the preset IR image signal is determined based on a preset to-be-illuminated position on the eye and a preset pattern.

4. The eye tracking system for a near-eye display device according to claim 1, wherein image signals other than the IR image signal in the multicolor image signal have an equal duty cycle, and a duty cycle of the IR image signal is greater than the duty cycle of other image signals.

5. The eye tracking system for a near-eye display device according to claim 4, wherein the preset IR image signal is determined based on a preset to-be-illuminated position on the eye and a preset pattern.

6. The eye tracking system for a near-eye display device according to claim 1, wherein the preset IR image signal is determined based on a preset to-be-illuminated position on the eye and a preset pattern.

7. The eye tracking system for a near-eye display device according to claim 6, wherein the multicolor image signal comprising the IR image signal is acquired based on the video signal and the preset IR image signal by:
performing image segmentation on the video signal according to a color sequential display rule to obtain image signals comprising an R image signal, a G image signal and a B image signal; and
inserting the preset IR image signal among the R, G, B image signals to obtain the multicolor image signal comprising the R image signal, the G image signal, the B image signal and the IR image signal.

8. The eye tracking system for a near-eye display device according to claim 1, wherein the homogenization system comprises a condenser lens, an optical rod and a homogenization lens.

9. A near-eye display device, comprising the eye tracking system according to claim 1.

10. The near-eye display device according to claim 9, wherein the near-eye display device is an augmented reality (AR) head-mounted device.

11. The eye tracking system for a near-eye display device according to claim 1, wherein the preset IR image signal is determined based on a preset to-be-illuminated position on the eye and a preset pattern.

\* \* \* \* \*